Dec. 13, 1955    F. S. CUTLER    2,726,710
ARM REST FOR AUTOMOBILES
Filed Feb. 1, 1954
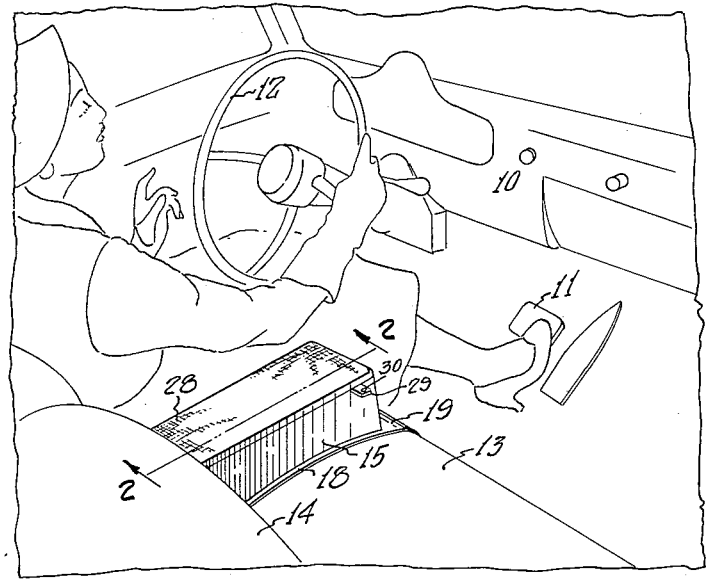
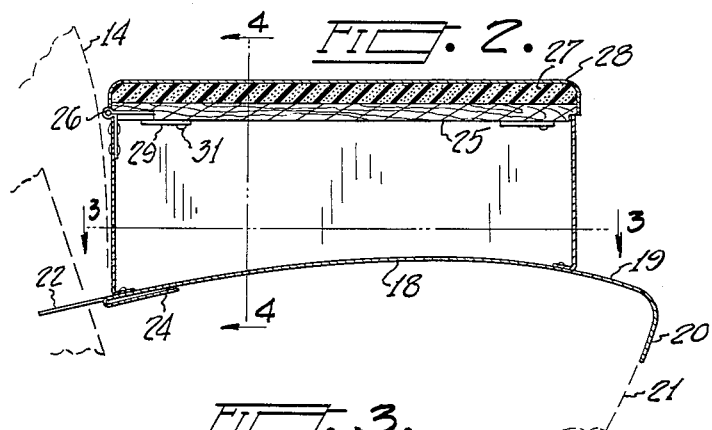
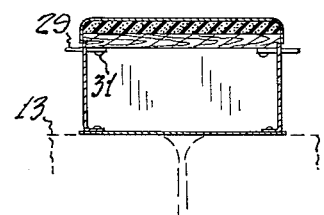
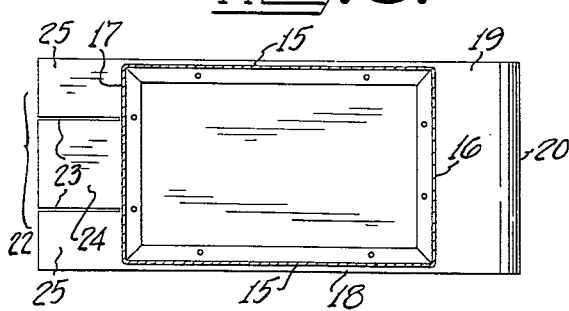
INVENTOR
FREDERIC S. CUTLER
ATTORNEY

United States Patent Office 2,726,710
Patented Dec. 13, 1955

2,726,710
ARM REST FOR AUTOMOBILES
Frederic S. Cutler, Portland, Oreg.

Application February 1, 1954, Serial No. 407,319

2 Claims. (Cl. 155—112)

This invention relates generally to automobiles and particularly to an arm rest therefor.

The main object of this invention is to provide an arm rest which is movable laterally on either the front or rear seats of an automobile.

The second object is to make it adaptable to various sizes and shapes of car seats.

The third object is to make it possible to shift its lateral position without unclamping or adjusting any parts and without the use of tools of any kind.

The fourth object is to provide an intermediate arm rest which can be used by two people and which can be used as a storage compartment or as a raised seat for children.

The fifth object is to so construct the device that it may be used on the jump seats of a car without alteration other than to bend backwardly one or two of the tongues extending from the rear end of the device.

I accomplish these and other objects in the manner set forth in the following specifications as illustrated in the accompanying drawing, in which—

Fig. 1 is a perspective view showing the location of the device in the automobile.

Fig. 2 is a section taken along the line 2—2 in Fig. 1, showing a portion turned back to clear the structural member of the car seat construction.

Fig. 3 is a section taken along the line 3—3 in Fig. 2, showing the central part not turned back.

Fig. 4 is a section taken along the line 4—4 in Fig. 2.

Like numbers of reference refer to the same or similar parts throughout the several views.

Referring in detail to the drawing there is shown in Fig. 1 a portion of the driver's compartment, including the instrument panel 10, the brake pedal 11, steering wheel 12, as well as the front seat cushion 13 and seat back cushion 14.

Referring particularly to my device, it will be seen to consist of a rectangular box composed of sides 15, a front 16 and back 17. The lower edges of the sides 15 are curved to conform to the contour of the cushion 13. The bottom 18 is secured to the members 15, 16 and 17 by flanging the lower edges of those members and riveting them to the member 18.

It will be noted that the front end 19 extends forwardly of the front 16 and the extreme front end 20 is downturned to fit snugly against the seat cushion face 21.

The bottom 18 is of a metal which can be formed by hand to conform with the contour of the face 21. The end 22, which extends between the seat cushion 13 and the seat back cushion 14, is preferably provided with two slots 23 to permit either the middle section 24 or the end sections 25 to pass between the structural members of the seats, or outside of them, by bending the unused portion 24, for example, backwardly against the bottom 18, as shown in Fig. 2.

The cover for the box is formed of wood 25, which is attached to the back 17 by means of hinges 26 and supports a sponge rubber pad 27 covered with a suitable material 28, such as plastic, fabric, or real or imitation leather.

A hidden lock may be placed on the cover if desired without departing from the spirit of the invention.

At each corner of the cover 25 is placed a flat link 29 which has an eye 30 for the anchorage of a belt (not shown) which normally fastens to the links 29 which are turned inwardly on the screws 31 to permit the belt to be folded away within the box. The belt is used to insure a child remaining on the seat if the car is stopped suddenly.

In some instances the under side of the member 18 is covered with rubber or other material having more friction than does the bare metal to assist the device in resisting longitudinal or lateral movement.

In practice it is well to leave ample clearance between the back 17 and the seat back cushion, preferably four or five inches.

Other devices purporting to be for the same purpose were patented by Gorman 2,524,659; Hines 2,524,909 and Reed 2,633,180, over which the device described herein is an improvement.

I claim:

1. An arm rest for automobiles comprised of a rectangular box having a padded top hinged at its rear end and having a bottom of deformable metal extending beyond the front and rear ends of said box whereby said bottom may be curved to fit the contour of the automobile seat cushion in a fore and aft direction.

2. An arm rest for automobiles comprised of a rectangular box having a padded hinged cover, said box having the bottom thereof curved along its length to conform to the contour of a seat cushion in a fore and aft direction, the rear end of said bottom comprising deformable metal extending between the rear edge of the seat cushion and the bottom edge of the seat back cushion, and the front end of said bottom comprising deformable metal which may be curved downwardly around the front edge of the seat cushion.

References Cited in the file of this patent

UNITED STATES PATENTS

| Number | Name | Date |
|---|---|---|
| 2,006,883 | Davies et al. | July 2, 1935 |
| 2,086,244 | Smith | July 6, 1937 |
| 2,160,282 | Rehg | May 30, 1939 |
| 2,563,922 | Collins | Aug. 14, 1951 |
| 2,658,560 | Cawthon | Nov. 10, 1953 |
| 2,667,913 | Dustin | Feb. 2, 1954 |